United States Patent
Jiang

(10) Patent No.: US 10,698,308 B2
(45) Date of Patent: Jun. 30, 2020

(54) RANGING METHOD, AUTOMATIC FOCUSING METHOD AND DEVICE

(71) Applicant: ZTE Corporation, Shenzhen (CN)

(72) Inventor: Feng Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 176 days.

(21) Appl. No.: 15/569,889

(22) PCT Filed: Jul. 21, 2015

(86) PCT No.: PCT/CN2015/084708
§ 371 (c)(1),
(2) Date: Oct. 27, 2017

(87) PCT Pub. No.: WO2016/173131
PCT Pub. Date: Nov. 3, 2016

(65) Prior Publication Data
US 2018/0120687 A1 May 3, 2018

(30) Foreign Application Priority Data

Apr. 27, 2015 (CN) .......................... 2015 1 0205794

(51) Int. Cl.
*G03B 21/53* (2006.01)
*H04N 9/31* (2006.01)
(Continued)

(52) U.S. Cl.
CPC .............. *G03B 21/53* (2013.01); *G02B 7/28* (2013.01); *G03B 17/54* (2013.01); *H04N 9/317* (2013.01);
(Continued)

(58) Field of Classification Search
CPC .... H04N 9/317; H04N 9/3188; H04N 9/3194; G03B 21/53; G03B 21/142; G03B 17/54; G02B 7/28
See application file for complete search history.

(56) References Cited

U.S. PATENT DOCUMENTS 6,549,286 B2   4/2003   Komulainen et al.
7,303,289 B2 * 12/2007  Fujiwara ............. G02B 26/101
                                                   353/101

(Continued)

FOREIGN PATENT DOCUMENTS

CN    101281289 A    10/2008
CN    102375316 A     3/2012
(Continued)

OTHER PUBLICATIONS

Supplementary European Search Report in European application No. 15890508.3, dated May 15, 2018, 8 pgs.
(Continued)

*Primary Examiner* — David E Harvey
(74) *Attorney, Agent, or Firm* — Cooper Legal Group, LLC

(57) ABSTRACT

Described are a ranging method, and an automatic focusing method and device. The ranging method comprises: acquiring a coefficient of relationship between the number of pixels and the object distance within a range of a distance between a camera and a projection lens on the basis of a preset calibrated object distance; and calculating an actual object distance according to the acquired coefficient of relationship.

13 Claims, 2 Drawing Sheets

(51) Int. Cl.
*G03B 17/54* (2006.01)
*G02B 7/28* (2006.01)

(52) U.S. Cl.
CPC ......... *H04N 9/3188* (2013.01); *H04N 9/3194* (2013.01)

(56) References Cited

U.S. PATENT DOCUMENTS

| | | | |
|---|---|---|---|
| 8,491,127 B2 | 7/2013 | Wang | |
| 9,160,930 B2 | 10/2015 | Ishii | |
| 2002/0113975 A1 | 8/2002 | Komulainen et al. | |
| 2004/0130685 A1* | 7/2004 | Wu | G02B 7/282 353/101 |
| 2005/0099609 A1 | 5/2005 | Masuzawa et al. | |
| 2009/0279055 A1* | 11/2009 | Amano | G03B 3/00 353/101 |
| 2010/0328453 A1* | 12/2010 | Kiesshauer | G03B 21/53 348/135 |
| 2012/0050701 A1 | 3/2012 | Wang | |
| 2012/0320346 A1* | 12/2012 | Sakamoto | G02B 7/28 353/101 |
| 2014/0002706 A1 | 1/2014 | Ishii | |
| 2014/0071305 A1 | 3/2014 | Hiasa et al. | |

FOREIGN PATENT DOCUMENTS

| | | | |
|---|---|---|---|
| CN | 102494610 A | 6/2012 | |
| CN | 202771144 U | 3/2013 | |
| CN | 203178660 U | 9/2013 | |
| CN | 103686134 A | 3/2014 | |
| CN | 104536249 A | 4/2015 | |
| DE | 10323208 A1 * | 7/2004 | ............ G02B 7/282 |
| JP | 2006023400 A | 1/2006 | |

OTHER PUBLICATIONS

International Search Report in international application No. PCT/CN2015/084708 dated Jan. 22, 2016, 4 pgs.

English Translation of the Written Opinion of the International Search Authority in international application No. PCT/CN2015/048708, dated Jan. 22, 2016, 8 pgs.

First Chinese Office Action cited in Chinese Application No. 201510205794.X dated Jun. 3, 2019, 19 pgs.

* cited by examiner

RANGING METHOD, AUTOMATIC FOCUSING METHOD AND DEVICE

TECHNICAL FIELD

The disclosure relates to a projector technology, and more particularly to a ranging method, and an automatic focusing method and device.

BACKGROUND

With the intelligent development of projector applications, requirements for imaging clarity of a projector are increasing. A projector body projects a projection picture to a screen or a wall through a projection lens, and it is necessary to adjust a projection focusing device to focus the projection lens when a projection distance changes.

At present, a smart terminal with a projection function adjusts a projection focal distance in automatic focusing manners. Herein, in one manner, it refers to: projecting an image to a screen, capturing the image through a camera, re-converting the collected image into a digital image signal by an image collection chip, and processing the image; and moving a position of a motor to perform scanning, calculating image clarity evaluation values of different positions, and taking a position with the highest image clarity evaluation value as an optimum position. According to this manner, once the motor is moved, it is necessary to capture and process an image after waiting for stabilization of the motor and an image synchronization signal. Thus, only one image is captured for each frame, and since scanning is required, a focusing speed is low. Under extreme situations, it is even necessary to scan the whole motor range (the motor is located at the vertex of one end, and the optimum position is located at the vertex of another end). Moreover, after focusing, an image also has a certain probability of being not clear.

In another manner, it refers to: after measuring a distance between a screen and a projection by using an additional ranging device, driving a motor according to a relationship between the distance and the focal distance, and moving a projection lens to a specified position. Although this manner is simple, an imaging clarity detection device is not adopted, so that errors between individuals cannot be solved.

SUMMARY

The disclosure provides a ranging method, and an automatic focusing method and device, capable of achieving ranging. Application to automatic focusing can simply and reliably achieve projection focusing and improve a focusing speed and the imaging clarity of a projector.

A ranging method includes: acquiring, based on a preset calibrated object distance, a coefficient of relationship between an object distance and a number of pixels within a range of a distance between a camera and a projection lens; and calculating an actual object distance according to the obtained coefficient of relationship.

Alternatively, the acquiring the coefficient of relationship may include: projecting an image to a screen based on the preset calibrated object distance, capturing the image through the camera, and identifying the projected image; and calculating a horizontal center position of the projected image and a number of pixels $N_{pix}$ within a range of a distance h between the projection lens and the camera, and acquiring a coefficient of relationship between an object distance d and the number of pixels $N_{pix}$ according to the calculated horizontal center position and the number of pixels $N_{pix}$ within the range of the distance h.

Alternatively, there may be two or more preset calibrated object distances. The method may further include:

calculating an average value of the coefficients of relationship obtained at each time, and obtaining a final coefficient of relationship.

Alternatively, the calculating the actual object distance according to the obtained coefficient of relationship may include:

projecting an image to a screen, capturing the image through the camera, and identifying the projected image; and acquiring the actual object distance according to the obtained coefficient of relationship, a horizontal center position of the projected image and a number of pixels $N_{pix}$ within a range of a distance h between the projection lens and the camera.

Alternatively, the image projected to the screen may be a special projection picture, or a special light source, or is used to identify left and right sides of the projection picture.

An automatic focusing method includes: acquiring, based on a preset calibrated object distance, a coefficient of relationship between an object distance and a number of pixels within a range of a distance between a camera and a projection lens;

calculating an actual object distance according to the obtained coefficient of relationship in an automatic focusing process; and acquiring a position of the motor according to the obtained actual object distance, and performing focusing within a preset range of the position of the motor.

Alternatively, the acquiring the coefficient of relationship may include: projecting an image to a screen based on the preset calibrated object distance, capturing the image through the camera, and identifying the projected image; and calculating a horizontal center position of the projected image and a number of pixels $N_{pix}$ within a range of a distance h between the projection lens and the camera, and acquiring a coefficient of relationship between an object distance d and the number of pixels $N_{pix}$ according to the calculated horizontal center position and the number of pixels $N_{pix}$ within the range of the distance h.

Alternatively, there may be two or more preset calibrated object distances. The method may further include:

calculating an average value of the coefficients of relationship obtained at each time, and obtaining a final coefficient of relationship.

Alternatively, the calculating the actual object distance according to the obtained coefficient of relationship may include:

projecting an image to a screen, capturing the image through the camera, and identifying the projected image; and acquiring the actual object distance according to the obtained coefficient of relationship, a horizontal center position of the projected image and a number of pixels $N_{pix}$ within a range of a distance h between the projection lens and the camera.

Alternatively, the acquiring the position of the motor according to the obtained actual object distance may include:

presetting a corresponding relationship between the object distance and the position of the motor; searching, according to the obtained actual object distance, the corresponding relationship for the position of the motor corresponding to the obtained actual object distance;

or, directly calculating the position of the motor according to the obtained actual object distance.

Alternatively, the distance h between the projection lens and the camera may be within an allowable range of a mechanical structure.

An automatic focusing method includes: acquiring, based on a preset calibrated object distance, a coefficient of relationship between an object distance and a number of pixels within a range of a distance between a camera and a projection lens; obtaining a corresponding relationship between a position of the motor and the number of pixels within the range of the distance between the camera and the projection lens according to a corresponding relationship between the object distance and the position of the motor and the coefficient of relationship;

calculating the number of pixels within the range of the distance between the camera and the projection lens in an automatic focusing process; and acquiring the position of the motor according to the obtained corresponding relationship between the position of the motor and the number of pixels within the range of the distance between the camera and the projection lens, and the number of pixels within the range of the distance between the camera and the projection lens, and performing focusing within a preset range of the position of the motor.

Alternatively, the calculating the number of pixels within the range of the distance between the camera and the projection lens may include:

projecting an image to a screen, capturing the image through the camera, and identifying the projected image; and calculating a number of pixels $N_{pix}$ within a range of a distance h between the camera and the projection lens according to a horizontal center position of the projected image.

Alternatively, the acquiring the position of the motor according to the obtained corresponding relationship between the position of the motor and the number of pixels within the range of the distance between the camera and the projection lens and the number of pixels within the range of the distance between the camera and the projection lens may include:

searching for the corresponding position of the motor according to a obtained number of pixels $N_{pix}$ within a range of a distance h between the camera and the projection lens.

Alternatively, the distance h between the projection lens and the camera may be within an allowable range of a mechanical structure.

A ranging device includes a first detection module and a first processing module, wherein the first detection module is configured to acquire, based on a preset calibrated object distance, a coefficient of relationship between an object distance and a number of pixels within a range of a distance h between a camera and a projection lens; and the first processing module is configured to calculate an actual object distance according to the obtained coefficient of relationship.

Alternatively, the first detection module may be configured to: project an image to a screen based on the preset calibrated object distance, capture the image through the camera, and identify the projected image; and calculate a horizontal center position of the projected image and a number of pixels $N_{pix}$ within a range of a distance h between the projection lens and the camera, and acquire a coefficient of relationship between an object distance d and the number of pixels $N_{pix}$ according to the calculated horizontal center position and the number of pixels $N_{pix}$ within the range of the distance h.

Alternatively, the first processing module may be configured to: project an image to the screen, capture the image through the camera, and identify the projected image; and acquire the actual object distance according to the coefficient of relationship, the horizontal center position of the projected image and the number of pixels $N_{pix}$ within the range of the distance h.

An automatic focusing device includes a first detection module, a first processing module and a first execution module, wherein the first detection module is configured to acquire, based on a preset calibrated object distance, a coefficient of relationship between an object distance and a number of pixels within a range of a distance h between a camera and a projection lens;

the first processing module is configured to calculate an actual object distance according to the obtained coefficient of relationship in an automatic focusing process; and the first execution module is configured to acquire a position of the motor according to the obtained actual object distance, and perform focusing within a preset range of the position of the motor.

Alternatively, the first detection module may be configured to: project an image to a screen based on the preset calibrated object distance, capture the image through the camera, and identify the projected image; and calculate a horizontal center position of the projected image and a number of pixels $N_{pix}$ within a range of a distance h between the projection lens and the camera, and acquire a coefficient of relationship between an object distance d and the number of pixels $N_{pix}$ according to the calculated horizontal center position and the number of pixels $N_{pix}$ within the range of the distance h.

Alternatively, the first processing module may be configured to: project an image to the screen, capture the image through the camera, and identify the projected image; and acquire the actual object distance according to the coefficient of relationship, the horizontal center position of the projected image and the number of pixels $N_{pix}$ within the range of the distance h.

Alternatively, the first execution module may be configured to: preset a corresponding relationship between the object distance and the position of the motor; search, according to the obtained actual object distance, the corresponding relationship for the position of the motor corresponding to the obtained actual object distance, and perform focusing within a preset range of the position of the motor; or, directly calculate the position of the motor according to the obtained actual object distance and perform focusing within the preset range of the position of the motor.

An automatic focusing device includes a second detection module, a second processing module and a second execution module, wherein the second detection module may be configured to: acquire, based on a preset calibrated object distance, a coefficient of relationship between an object distance and a number of pixels within a range of a distance between a camera and a projection lens; and obtain a corresponding relationship between a position of the motor and the number of pixels within the range of the distance between the camera and the projection lens according to a corresponding relationship between the object distance and the position of the motor and the coefficient of relationship;

the second processing module may be configured to calculate the number of pixels within the range of the distance between the camera and the projection lens in an automatic focusing process; and the second execution module may be configured to: acquire the position of the motor according to the obtained corresponding relationship between the position of the motor and the number of pixels within the range of the distance between the camera and the projection lens and the number of pixels within the range of the distance between the camera and the projection lens, and perform focusing within a preset range of the position of the motor.

Compared with the related art, the technical solution of the present application includes: acquiring, based on a preset calibrated object distance, a coefficient of relationship between an object distance and a number of pixels within a range of a distance between a camera and a projection lens; and calculating an actual object distance according to the obtained coefficient of relationship in an automatic focusing process. The technical solution provided in an embodiment of the disclosure achieves ranging.

In addition, the technical solution of automatic focusing provided in an embodiment of the disclosure includes: acquiring, based on a preset calibrated object distance, a coefficient of relationship between an object distance and a number of pixels within a range of a distance between a camera and a projection lens; calculating an actual object distance according to the obtained coefficient of relationship in an automatic focusing process; and acquiring a position of a motor according to the obtained actual object distance, and performing focusing within a preset range of the position of the motor. By means of the obtained position of the motor, an embodiment of the disclosure limits the movement range of the motor during focusing. That is to say, during focusing, the motor only needs to search near the obtained position of the motor so as to obtain an optimum position, thus simply and reliably achieving projection focusing, and increasing a focusing speed. Moreover, in the method embodiments of the disclosure, by detecting the imaging clarity, the imaging clarity of a projector is also improved.

DETAILED DESCRIPTION

The detailed description will be illustrated with reference to the drawings in detail. It is important to note that embodiments in the disclosure and characteristics in the embodiments can be combined under the condition of no conflicts.

Figure 1:
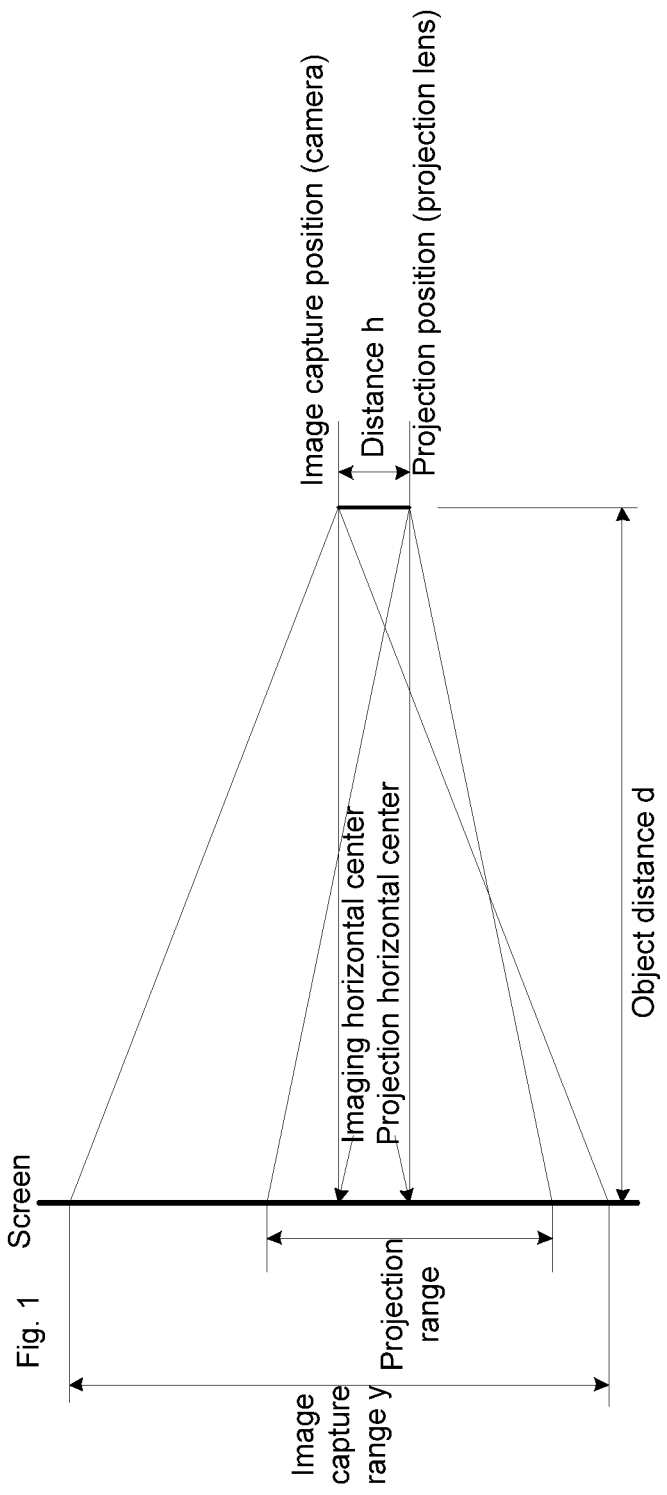
FIG. 1 is an analysis diagram of implementation principle of automatic focusing according to an embodiment of the disclosure.

In a practical application, FIG. 1 is an analysis diagram of implementation principle of automatic focusing according to an embodiment of the disclosure. As shown in FIG. 1, the inventor finds that: a distance h between a camera and a projection lens is fixed, and object distances d between a screen and a projector are different/varied, the number of pixels $N_{pix}$ within a range of the distance h is different. That is to say, focusing can be performed by ranging according to this principle.

A relationship between an image capture range y and the object distance d is linear, that is, the image capture range $y=k \times d$, where k is a constant; and after a camera is selected, pixel values of an image capture picture in a horizontal and vertical directions are fixed, and therefore a relationship between the width of each pixel and the object distance d is also linear. A three-million-pixel camera and a 4:3 picture are taken as an example, the resolution is 2048*1536, that is, there are 2048 pixels in the horizontal direction, then the width of the pixel $y_{pix}=y/2048=(k \times d)/2048$.

A distance between a projection horizontal center of a projection picture and an image capture horizontal center of an image capture picture, namely the distance h between the projection lens and the camera, is fixed. The number of pixels $N_{pix}$ within the range of the distance h satisfies $N_{pix}=h/y_{pix}=(h \times 2048)/(k \times d)$, where h and k are constants, that is to say, the number of pixels $N_{pix}$ within the range of the distance h is inversely proportional to the object distance d.

Therefore, the inventor comes to a conclusion that the object distance d can be measured by measuring the number of pixels within the distance h. A person skilled in the art knows that, on one hand, the position of a motor driving the projection lens to move corresponds to the focal distance of the projection lens, and on the other hand, the focal distance of the projection lens also corresponds to the object distance d based on optical knowledge. That is to say, the position of the motor corresponds to the object distance d, for a specific product, this relationship can be obtained by theoretical calculation or can be obtained by experimental data, and will not be elaborated.

Figure 2:
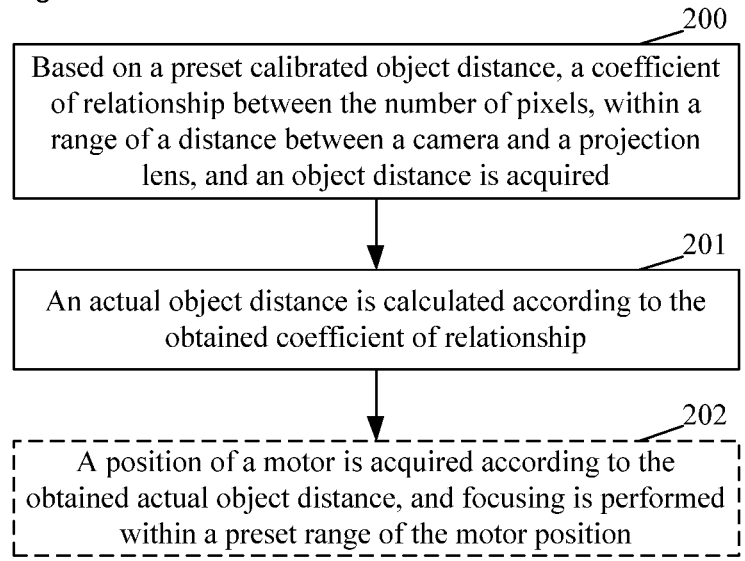
FIG. 2 is a flow chart of a ranging method according to an embodiment of the disclosure.

FIG. 2 is a flow chart of a ranging method according to an embodiment of the disclosure. As shown in FIG. 2, the method includes the steps as follows.

In step 200, based on a preset calibrated object distance, a coefficient of relationship between the number of pixels, within a range of a distance between a camera and a projection lens, and an object distance is acquired.

This step includes:

projecting an image to a screen based on the preset calibrated object distance, capturing the image through the camera, and identifying the projected image; and calculating a horizontal center position of the projected image and the number of pixels $N_{pix}$ within a range of a distance h, and acquiring a coefficient of relationship between an object distance d and the number of pixels $N_{pix}$ according to the calculated horizontal center position and the number of pixels $N_{pix}$ within the range of the distance h.

For example, if k=0.5, an image capture range y=0.5d; the distance h=5 cm=0.05 m; the calibrated object distance $d_{calibrated}$=1 m=100 cm; and if the camera is of three-million-pixel, the resolution is 2048*1536.

The horizontal center position of the projected image is a vertical line, and calculating the horizontal center position of the projected image, that is, calculating the horizontal position of the vertical line, includes the steps as follows.

Firstly, the width of a pixel $y_{pix}=y/2048=(k \times d)/2048=(1 \times 0.5)/2048=0.5/2048$, the horizontal position of the vertical line is equal to $$(y/2-h)/y_{pix} = [(1\times 0.5)/2 - 0.05]/y_{pix} =$$
$$0.2/y_{pix} = (0.2\times 2048)/0.5 \approx 819;$$

in this case, the object distance d is a calibrated object distance $d_{calibrated}=1$ m.

From the above calculation, it can be seen that the identified vertical line should be located at the $819^{th}$ pixel.

Then, the number of pixels $N_{pix}$ within the range of the distance h is calculated as $N_{pix}=1024-819=205$.

And then, $d\times N_{pix}=100\times 205=20500$, that is, $d\approx 20500/N_{pix}$ cm. That is to say, a coefficient c of relationship between the object distance d and the number of pixels $N_{pix}$ is 20500.

By means of the calibration process in this step, the imaging clarity can be detected, and the coefficient of relationship between the number of pixels, within the range of the distance between the camera and the projection lens, and the object distance is obtained.

There may be two or more preset calibrated object distances, so as to better ensure the imaging clarity, i.e., to better eliminate errors between individuals. For example, it is supposed that calibration is performed by presetting another calibrated object distance as 3 m based on the above-mentioned calibrated object distance $d_{calibrated}=1$ m. A substantial process is as follows.

When the calibrated object distance $d_{calibrated}=3$ m=300 cm, under ideal situations, the horizontal position of the identified vertical line is equal to $(y/2-h)/y_{pix}=[(3\times 0.5)/2-0.05]/y_{pix}\approx 956$; in this case, the object distance d is the calibrated object distance $d_{calibrated}=3$ m.

In this case, the identified vertical line should be located at the $956^{th}$ pixel, then the number of pixels within the range of the distance h satisfies $N_{pix}=1024-956=68$;

Thus, when the calibrated object distance $d_{calibrated}=3$ m, $d\times N_{pix}=300\times 68=20400$, that is, $d\approx 20400/N_{pix}$ cm. That is to say, a coefficient c of relationship between the object distance d and the number of pixels $N_{pix}$ satisfies c=20400.

When two or more calibration processes are adopted, a plurality of coefficients of relationship obtained for many times can be further processed. For example, an average value is calculated. Thus, the imaging clarity is better ensured, that is, errors between individuals are better eliminated.

In step 201, an actual object distance is calculated according to the obtained coefficient of relationship.

The implementation of this step is consistent with step 200, and it includes that:

projecting an image to the screen, capturing the image through the camera, and identifying the projected image; and acquiring the actual object distance according to the coefficient of relationship, and formulae for calculating a horizontal center position of the projected image and the number of pixels $N_{pix}$ within the range of the distance h. However, in this case, the coefficient of relationship between the number of pixels, within the range of the distance between the camera and the projection lens, and the object distance is known, and the actual object distance can be obtained by substituting the coefficient of relationship into the above formulae for calculating the number of pixels $N_{pix}$ within the range of the distance h and a horizontal position of a vertical line.

When the ranging method according to an embodiment of the disclosure is applied to an automatic focusing process, the method further includes:

step 202, a position of a motor is acquired according to the obtained actual object distance in an automatic focusing process, and focusing is performed within a preset range of the position of the motor.

The position of the motor corresponds to the object distance d, and for a specific product, this relationship can be obtained by using theoretical calculation or can be obtained by using experimental data.

Therefore, the step of acquiring the position of the motor may include:

presetting a corresponding relationship between the object distance and the position of the motor; and searching the corresponding relationship for the corresponding position of the motor after obtaining the actual object distance.

Or, the step of acquiring the position of the motor may also include:

directly calculating the position of the motor according to the obtained actual object distance by utilizing the known theoretical calculation method.

In this step, the preset range of the position of the motor refers to a position near the position of the motor, and is a range obviously smaller than a range from one end of the motor to the other end of the motor, wherein the preset range may be a range from five steps ahead of the position of the motor to five steps behind the position of the motor, and can be determined according to actual situations, so as to make the focused projected image clear enough, which will not be limited herein.

By means of the position of the motor obtained in this step, the movement range of the motor during focusing is limited. That is to say, during focusing, the motor only needs to search near the obtained position of the motor so as to obtain an optimum position, thus simply and reliably achieving projection focusing, and increasing a focusing speed. Moreover, in the method embodiments of the disclosure, by detecting the imaging clarity, the imaging clarity of a projector is also improved.

From the perspective of the method of calculating the number of pixels $N_{pix}$ within the range of the distance h in the embodiments of the disclosure, since the horizontal position of the vertical line may be needed to be rounded and is an approximate value, if the distance h is greater, the number of pixels $N_{pix}$ within the range of the distance h will be more. The rounding process will make a result more accurate, and therefore the distance between the projection lens and the camera in the embodiments of the disclosure may be properly wide. Within an allowable range of a mechanical structure, when the distance is greater, then errors are smaller.

The image projected to the screen in the embodiments of the disclosure may be a special projection picture or a special light source such as laser or may be used to identify left and right sides of the projection picture (i.e., the horizontal center position of the projected image is calculated by using the left and right sides of the identified projection picture).

When the method is applied to the automatic focusing process, step 200 may further include: obtaining a corresponding relationship between the number of pixels, within the range of the distance between the camera and the projection lens, and the position of the motor according to a corresponding relationship between the object distance and the position of the motor and the coefficient of relationship. An implementation method in step 201 may also include: projecting an image to the screen, capturing the image through the camera, and identifying the projected image; and calculating the number of pixels $N_{pix}$ within the range of the distance h according to the formula of horizontal center position of the projected image. That is, after the number of pixels $N_{pix}$ within the range of the distance h is calculated in step 201, an actual object distance will not be calculated any longer. In step 202, a current position of the motor is obtained by direct searching according to the corresponding relationship between the number of pixels $N_{pix}$, within the range of the distance h, and the position of the motor.

Figure 3:
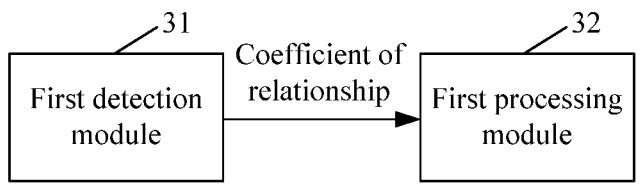
FIG. 3 is a composition structure diagram of a ranging device according to an embodiment of the disclosure.

FIG. 3 is a composition structure diagram of a ranging device according to an embodiment of the disclosure. As shown in FIG. 3, the device includes a first detection module 31 and a first processing module 32, wherein the first detection module 31 is configured to acquire, based on a preset calibrated object distance, a coefficient of relationship between the number of pixels, within a range of a distance between a camera and a projection lens, and an object distance; and the first processing module 32 is configured to calculate an actual object distance according to the obtained coefficient of relationship.

wherein, the first detection module 31 is configured to: project an image to a screen based on the preset calibrated object distance, capture the image through the camera, and identify the projected image; and calculate a horizontal center position of the projected image and the number of pixels $N_{pix}$ within a range of a distance h, and acquire a coefficient of relationship between an object distance d and the number of pixels $N_{pix}$ according to the calculated horizontal center position and the number of pixels $N_{pix}$ within the range of the distance h.

The first processing module 32 is configured to: project an image to the screen, capture the image through the camera, and identify the projected image; and acquire the actual object distance according to the obtained coefficient of relationship, a horizontal center position of the projected image and the number of pixels $N_{pix}$ within the range of the distance h between the projection lens and the camera.

Figure 4:
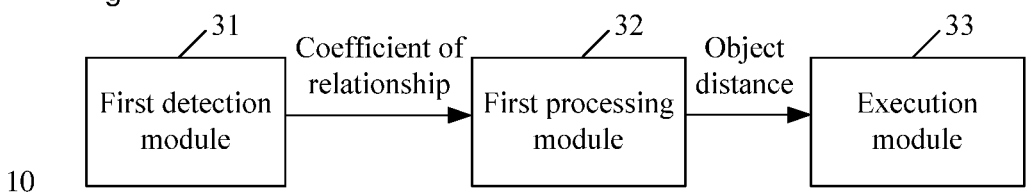
FIG. 4 is a composition structure diagram of an automatic focusing device according to an embodiment of the disclosure.

When the ranging method in the embodiments of the disclosure is applied to automatic focusing, as shown in FIG. 4, an embodiment of the disclosure also provides an automatic focusing device, which includes the above-mentioned first detection module 31 and first processing module 32, and further includes a first execution module 33 configured to acquire a position of a motor according to the obtained actual object distance in an automatic focusing process, and perform focusing within a preset range of the position of the motor.

The first execution module 33 is configured to: preset a corresponding relationship between the object distance and the position of the motor; search the corresponding relationship for the corresponding position of the motor according to the obtained actual object distance, and perform focusing within the preset range of the position of the motor; or, directly calculate the position of the motor according to the obtained actual object distance by utilizing a known theoretical calculation method, and perform focusing within the preset range of the position of the motor.

Figure 5:
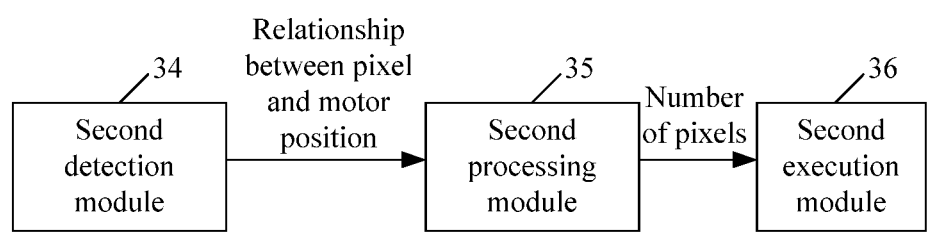
FIG. 5 is a composition structure diagram of another automatic focusing device according to an embodiment of the disclosure.

When the ranging method in the embodiments of the disclosure is applied to automatic focusing, as shown in FIG. 5, an embodiment of the disclosure also provides an automatic focusing device, which includes a second detection module 34, a second processing module 35 and a second execution module 36, wherein the second detection module 34 is configured to: acquire, based on a preset calibrated object distance, a coefficient of relationship between the number of pixels, within a range of a distance between a camera and a projection lens, and an object distance; and obtain a corresponding relationship between the number of pixels, within the range of the distance between the camera and the projection lens, and a position of a motor according to a corresponding relationship between the object distance and the position of the motor and the coefficient of relationship;

the second processing module 34 is configured to calculate the number of pixels within the range of the distance between the camera and the projection lens in an automatic focusing process; and the second execution module 35 is configured to: acquire the position of the motor according to the number of pixels within the range of the distance between the camera and the projection lens and the obtained corresponding relationship between the number of pixels, within the range of the distance between the camera and the projection lens, and the position of the motor, and perform focusing within a preset range of the position of the motor.

Those skilled in the art may understand that all or some of the steps of the above-mentioned embodiment may be implemented by using a computer program flow. The computer program may be stored in a computer-readable storage medium. The computer program is executed on a corresponding hardware platform (such as system, equipment, device and apparatus). During execution, the computer program includes one of the steps of the method embodiment or a combination thereof.

Alternatively, all or some of the steps of the above-mentioned embodiment may also be implemented by using an integrated circuit. These steps may be manufactured into integrated circuit modules respectively, or a plurality of modules or steps therein are manufactured into a single integrated circuit module.

Each device/functional module/function unit in the above-mentioned embodiment may be implemented by using a general computation device. They may be centralized on a single computation device or may be distributed on a network composed of a plurality of computation devices.

When being implemented in a form of software function module and sold or used as an independent product, each device/functional module/function unit in the above-mentioned embodiment may be stored in a computer-readable storage medium. The above-mentioned computer-readable storage medium may be a read-only memory, a magnetic disk or an optical disk.

INDUSTRIAL APPLICABILITY

The technical solution provided in an embodiment of the disclosure achieves ranging. In addition, in an embodiment of the disclosure, a position of a motor is acquired according to an obtained actual object distance, and focusing is performed within a preset range of the position of the motor. By means of the obtained position of the motor, an embodiment of the disclosure limits the movement range of the motor during focusing. That is to say, during focusing, the motor only needs to search near the obtained position of the motor so as to obtain an optimum position, thus simply and reliably achieving projection focusing, and increasing a focusing speed. Moreover, in the method embodiments of the disclosure, by detecting the imaging clarity, the imaging clarity of a projector is also improved.

The invention claimed is:

1. A ranging method, comprising:

acquiring, based on a preset calibrated object distance, a coefficient of relationship between an object distance and a number of pixels within a range of a distance between a camera and a projection lens; and calculating an actual object distance according to the acquired coefficient of relationship;

wherein the acquiring the coefficient of relationship comprises:

projecting an image to a screen based on the preset calibrated object distance, capturing the image through the camera, and identifying the projected image; and calculating a horizontal center position of the projected image and a number of pixels ($N_{pix}$) within a range of a distance (h) between the projection lens and the camera, and acquiring a coefficient of relationship between an object distance (d) and the number of pixels ($N_{pix}$) according to the calculated horizontal center position and the number of pixels ($N_{pix}$) within the range of the distance (h).

2. The ranging method according to claim 1, further comprising:

when there are two or more preset calibrated object distances, calculating an average value of the coefficients of relationship acquired at each time, and obtaining a final coefficient of relationship.

3. The ranging method according to claim 1, wherein the calculating the actual object distance according to the acquired coefficient of relationship comprises:

acquiring the actual object distance according to the acquired coefficient of relationship between the object distance (d) and the number of pixels ($N_{pix}$).

4. The ranging method according to claim 1, wherein the image projected to the screen is a special projection picture, or a special light source, or is used to identify left and right sides of a projection picture.

5. An automatic focusing method, comprising:

acquiring, based on a preset calibrated object distance, a coefficient of relationship between an object distance and a number of pixels within a range of a distance between a camera and a projection lens;

calculating an actual object distance according to the acquired coefficient of relationship in an automatic focusing process; and acquiring a position of a motor according to the calculated actual object distance, and performing focusing within a preset range of the position of the motor;

wherein the acquiring the coefficient of relationship comprises:

projecting an image to a screen based on the preset calibrated object distance, capturing the image through the camera, and identifying the projected image; and calculating a horizontal center position of the projected image and a number of pixels ($N_{pix}$) within a range of a distance (h) between the projection lens and the camera, and acquiring a coefficient of relationship between an object distance (d) and the number of pixels ($N_{pix}$) according to the calculated horizontal center position and the number of pixels ($N_{pix}$) within the range of the distance (h).

6. The automatic focusing method according to claim 5, further comprising:

when there are two or more preset calibrated object distances, calculating an average value of the coefficients of relationship acquired at each time, and obtaining a final coefficient of relationship.

7. The automatic focusing method according to claim 5, wherein the calculating the actual object distance according to the acquired coefficient of relationship comprises:

acquiring the actual object distance according to the acquired coefficient of relationship between the object distance (d) and the number of pixels ($N_{pix}$).

8. The automatic focusing method according to claim 5, wherein the acquiring the position of the motor according to the calculated actual object distance comprises:

presetting a corresponding relationship between the object distance and the position of the motor; searching, according to the calculated actual object distance, the corresponding relationship for the position of the motor corresponding to the calculated actual object distance;

or, directly calculating the position of the motor according to the calculated-actual object distance.

9. An automatic focusing method, comprising:

acquiring, based on a preset calibrated object distance, a coefficient of relationship between an object distance and a number of pixels within a range of a distance between a camera and a projection lens;

obtaining a corresponding relationship between a position of a motor and the number of pixels within the range of the distance between the camera and the projection lens according to a corresponding relationship between the object distance and the position of the motor and the coefficient of relationship;

calculating the number of pixels within the range of the distance between the camera and the projection lens in an automatic focusing process; and acquiring the position of the motor according to the obtained corresponding relationship between the position of the motor and the number of pixels within the range of the distance between the camera and the projection lens and the number of pixels within the range of the distance between the camera and the projection lens, and performing focusing within a preset range of the position of the motor;

wherein the calculating the number of pixels within the range of the distance between the camera and the projection lens comprises:

projecting an image to a screen, capturing the image through the camera, and identifying the projected image; and calculating a number of pixels ($N_{pix}$) within a range of a distance (h) between the camera and the projection lens according to a horizontal center position of the projected image.

10. The method according to claim 9, wherein the acquiring the position of the motor according to the obtained corresponding relationship between the position of the motor and the number of pixels within the range of the distance between the camera and the projection lens and the number of pixels within the range of the distance between the camera and the projection lens comprises:

searching for a corresponding position of the motor according to the calculated number of pixels ($N_{pix}$) within the range of the distance (h) between the camera and the projection lens.

11. A ranging device, comprising a first detector and a first processor, wherein the first detector is configured to acquire, based on a preset calibrated object distance, a coefficient of relationship between an object distance and a number of pixels within a range of a distance between a camera and a projection lens; and the first processor is configured to calculate an actual object distance according to the acquired coefficient of relationship, wherein the first detector is configured to: project an image to a screen based on the preset calibrated object distance, capture the image through the camera, and identify the projected image; and calculate a horizontal center position of the projected image and a number of pixels ($N_{pix}$) within a range of a distance (h) between the projection lens and the camera, and acquire a coefficient of relationship between an object distance (d) and the number of pixels ($N_{pix}$) according to the calculated horizontal center position and the number of pixels ($N_{pix}$) within the range of the distance h; and the first processor is configured to: acquire the actual object distance according to the acquired coefficient of relationship between the object distance (d) and the number of pixels ($N_{pix}$).

12. An automatic focusing device, comprising a first detector, a first processor and a first controller, wherein the first detector is configured to acquire, based on a preset calibrated object distance, a coefficient of relationship between an object distance and a number of pixels within a range of a distance (h) between a camera and a projection lens;

the first processor is configured to calculate an actual object distance according to the acquired coefficient of relationship in an automatic focusing process; and the first controller is configured to acquire a position of a motor according to the calculated actual object distance, and perform focusing within a preset range of the position of the motor, wherein the first detector is configured to: project an image to a screen based on the preset calibrated object distance, capture the image through the camera, and identify the projected image; and calculate a horizontal center position of the projected image and a number of pixels ($N_{pix}$) within a range of the distance (h) between the projection lens and the camera, and acquire a coefficient of relationship between an object distance (d) and the number of pixels ($N_{pix}$) according to the calculated horizontal center position and the number of pixels ($N_{pix}$) within the range of the distance (h); and the first processor is configured to: acquire the actual object distance according to the acquired coefficient of relationship between the object distance (d) and the number of pixels ($N_{pix}$).

13. The automatic focusing device according to claim 12, wherein the first controller is configured to:

preset a corresponding relationship between the object distance and the position of the motor; search, according to the calculated actual object distance, the corresponding relationship for the position of the motor corresponding to the calculated actual object distance; or, directly calculate the position of the motor according to the calculated-actual object distance.

* * * * *